(12) United States Patent
Valentine, Jr. et al.

(10) Patent No.: US 9,527,437 B2
(45) Date of Patent: Dec. 27, 2016

(54) LIGHTING ASSEMBLY FOR INTERIOR CABIN OF A VEHICLE

(71) Applicant: THE BOEING COMPANY, Chicago, IL (US)

(72) Inventors: William Hanson Valentine, Jr., Mill Creek, WA (US); Brock Prince, Mukilteo, WA (US); Matthew Roman Treinen, Seattle, WA (US); Alexey Meerov, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 61 days.

(21) Appl. No.: 14/604,809

(22) Filed: Jan. 26, 2015

(65) Prior Publication Data

US 2016/0214529 A1     Jul. 28, 2016

(51) Int. Cl.
*B60Q 3/02*       (2006.01)
*B60Q 3/00*       (2006.01)
*B64D 11/00*      (2006.01)

(52) U.S. Cl.
CPC ............ *B60Q 3/0289* (2013.01); *B60Q 3/001* (2013.01); *B60Q 3/0293* (2013.01); *B64D 2011/0038* (2013.01); *F21Y 2103/10* (2016.08); *F21Y 2115/10* (2016.08)

(58) Field of Classification Search
CPC ..... B60Q 3/0289; B60Q 3/001; B60Q 3/0293; B60Q 3/00; B60Q 3/025; B60Q 3/0253; B64D 47/02; B64D 2011/0038; F21V 5/043; F21W 2101/06; F21W 2101/08; F21Y 2103/003; F21Y 2115/10; F21Y 2103/10

See application file for complete search history.

(56) References Cited

U.S. PATENT DOCUMENTS

| | | | |
|---|---|---|---|
| 6,851,841 B2 * | 2/2005 | Sugihara | B60Q 3/001 362/237 |
| 7,221,271 B2 * | 5/2007 | Reime | B60Q 3/001 340/540 |
| 7,494,255 B2 | 2/2009 | Bryan | |
| 7,954,984 B2 * | 6/2011 | Okawa | B60Q 3/0279 362/488 |
| 9,022,597 B2 * | 5/2015 | Suzuki | G01N 21/8806 29/451 |
| 9,076,659 B2 * | 7/2015 | Yagi | H01L 25/0753 |
| 2013/0208473 A1 | 8/2013 | Palagashvili | |

* cited by examiner

*Primary Examiner* — Bao Q Truong
(74) *Attorney, Agent, or Firm* — Joseph M. Butscher; The Small Patent Law Group, LLC

(57) ABSTRACT

A lighting assembly configured to be positioned within an internal cabin of a vehicle may include a housing defining an internal lighting chamber, a lens secured within the internal lighting chamber, wherein the lens includes a central longitudinal axis, and at least one light-emitting channel secured within the internal lighting chamber. The light-emitting channel(s) is offset in relation to the central longitudinal axis.

20 Claims, 9 Drawing Sheets

LIGHTING ASSEMBLY FOR INTERIOR CABIN OF A VEHICLE

BACKGROUND OF THE DISCLOSURE

Embodiments of the present disclosure generally relate to lighting assemblies for use within an interior cabin of a vehicle, such as a commercial airplane, and more particularly to lighting assemblies that may direct light to multiple areas within an interior cabin of a vehicle.

Commercial aircraft include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Luminaires are used to illuminate various areas within a commercial airplane. For example, luminaires are secured to a portion of ceiling and shrouded from view. The luminaires are used to illuminate portions of the ceiling, walls, luggage bins, and/or the like within a cabin of the airplane.

With the introduction of light emitting diode (LED) based luminaires, interior cabin space may be illuminated with light of varying colors. Certain air carriers take advantage of this capability by using different colored lights for branding. For example, a particular air carrier may illuminate areas above luggage bins a certain color that are associated with the air carrier.

Further, LED based luminaires allow for custom lighting scenes within the cabin. For example, known systems include multiple luminaires that are used to mimic natural lighting, such as a sunrise or sunset, or a theatrical scene within the airplane.

In general, each luminaire shines light in a single direction, which is defined by an optical element of the luminaire. To illuminate different areas within an airplane, multiple luminaires are used. As another option, a single luminaire may be mechanically moved within the airplane to shine light at a different location. However, limited space within an aircraft may limit or prevent a luminaire from being moved.

Additionally, known luminaires include light emitters that are aligned with respect to a central longitudinal axis of each luminaire. Current aircraft interior general cabin lighting is incapable of producing convincing transverse (for example, transverse relative to a central longitudinal axis of a luminaire) lighting effects due to the light emitters being oriented about and along the longitudinal axis. Also, in various settings, the light emitted from the LEDs along the central longitudinal axis may be blocked from reaching a desired area, such as by a ceiling panel, portion of a luggage bin, or the like Accordingly, a need exists for a versatile and adaptable lighting assembly that may be used within an internal space of a vehicle.

SUMMARY OF THE DISCLOSURE

Certain embodiments of the present disclosure provide a lighting assembly configured to be positioned within an internal cabin of a vehicle. The lighting assembly may include a housing defining an internal lighting chamber, and a lens secured within the internal lighting chamber. The lens includes a central longitudinal axis. At least one light-emitting channel is secured within the housing. The light-emitting channels) is offset in relation to the central longitudinal axis.

The at least one light-emitting channel may include a first light-emitting channel offset from the central longitudinal axis at a first area, and a second light-emitting channel offset from the central longitudinal axis at a second area that differs from the first area. The first light-emitting channel is configured to output a first light beam that passes through the lens and is directed to a first location (such as a location on a ceiling, wall, or the like of the internal cabin of the vehicle), and the second light-emitting channel is configured to output a second light beam that passes through the lens and is directed to a second location. At least a portion of the second location is separate and distinct from the first location. In at least one embodiment, each of the first and second light-emitting channels includes a plurality of light emitting diodes (LEDs). LEDs of the first and second light-emitting channels that are configured to emit the same color light may be grouped in light clusters, for example.

The first and second light-emitting channels may be configured to be activated (for example, initially turned ON) in a staggered fashion. For example, the first light-emitting channel is activated at first times, and the second light-emitting channel is activated at second times that differ from the first times.

In at least one embodiment, the first and second light-emitting channels are configured to be in an ON state at different times. For example, the first light-emitting channel may be in the ON state at first times, and the second light-emitting channel may be in the ON state at second times that differ from the first times.

The lighting assembly may also include an on-axis light-emitting channel that is aligned with the central longitudinal axis. The lighting assembly may also include a printed circuit board including a central processing unit. The light emitting channel(s) may be mounted on the printed circuit board.

The lens may include a modified cylindrical shape with a first portion having a different curvature than a second portion. The lens may be a convergent lens.

Certain embodiments of the present disclosure provide a system for controlling lighting within an interior cabin of a vehicle. The system may include a lighting assembly configured to be positioned within an internal cabin of a vehicle, and a user interface that is configured to program and control the lighting assembly. The user interface may include a touch screen display that includes a channel selection area and a color selection area. In at least one embodiment, the color selection area includes a color ring and a color selector.

Certain embodiments of the present disclosure provide a vehicle that may include an interior cabin configured to accommodate one or more individuals, and at least one lighting assembly positioned within the interior cabin. The vehicle may also include a user interface that is configured to program and control the lighting assembly.

DETAILED DESCRIPTION OF THE DISCLOSURE

Figure 1:
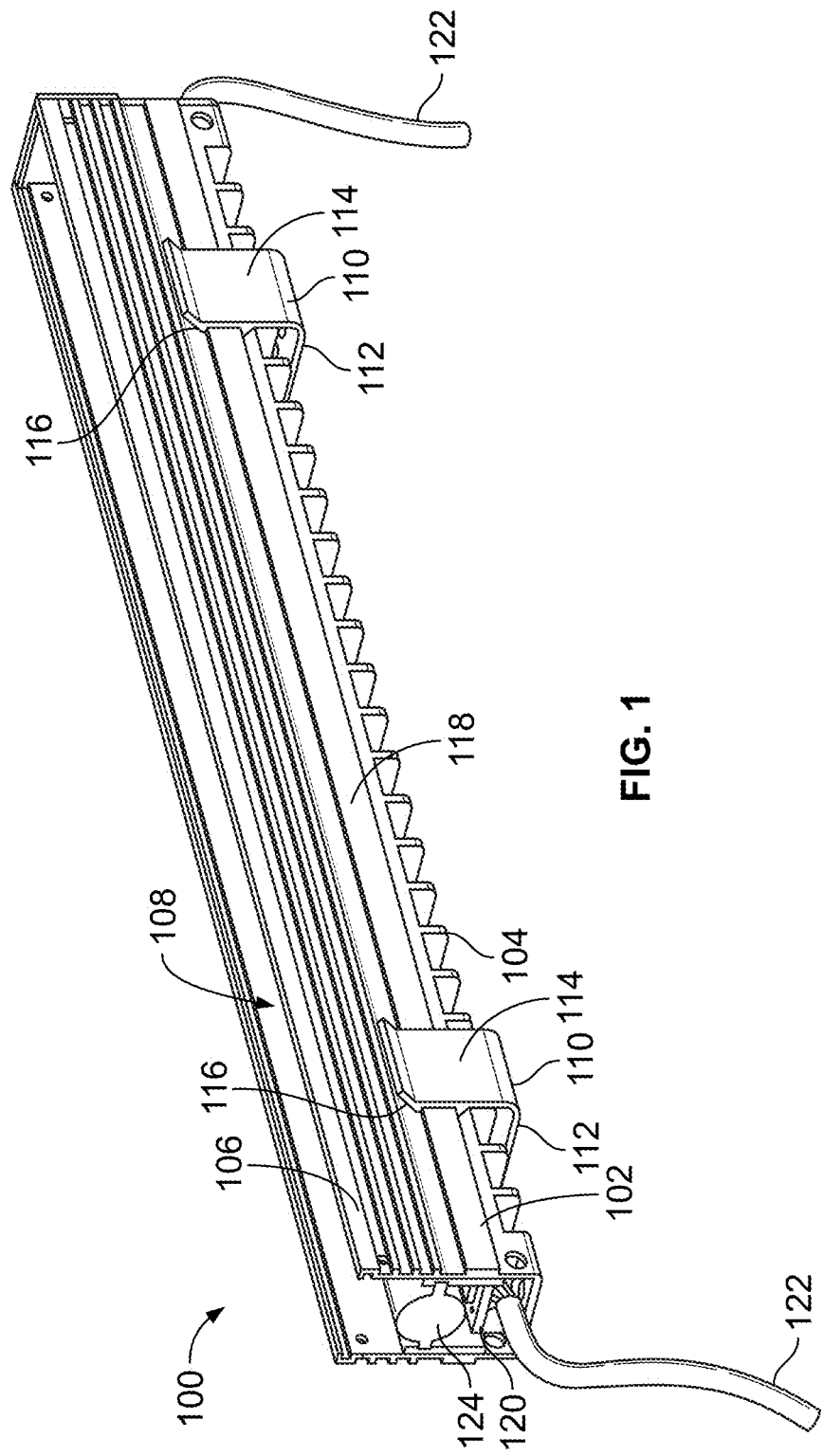
FIG. 1 illustrates a perspective view of a lighting assembly, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a lighting assembly that may include one or more light-emitting channels that may be offset from a central longitudinal axis, such as that of a lens of the lighting assembly. The lighting assembly may include a housing that retains multiple light-emitting channels and a single lens. Embodiments of the present disclosure are configured to emit light that may be aimed at and adjusted in relation to different areas in a seamless, efficient manner. The light-emitting channels and the lens are arranged to create multiple beams that may overlap and produce a homogenous output.

Certain embodiments of the present disclosure provide a lighting assembly that may include one or more light-emitting channels that include multiple light emitters, such as LEDs, a printed circuit board, a housing, and a lens, which has a primary or central longitudinal axis. The light emitters may include at least one cluster of multiple LEDs that emit the same color of light. The LEDs in the cluster may be variably offset relative to the primary longitudinal axis of the lens. A plurality of LED clusters that emit different colors of light may be proximally situated to each other.

Embodiments of the present disclosure are configured to provide highly-controllable condensed or otherwise lensed cross-bin lighting within a cabin of a vehicle, such as an aircraft. Light emitted from the lighting assembly may be directed to multiple locations with only a single lens, by way of multiple LEDs being offset from the primary or central longitudinal axis of the lens, for example. As such, the lighting assembly decreases overall weight of a lighting system (in the past, multiple luminaires were used to produce light at different areas), and may be secured within confined spaces of the vehicle.

Embodiments of the present disclosure provide a lighting assembly that may produce millions of colors at various locations within an interior space of a vehicle. The color scheme may be controlled in relation to a lateral zone (because of the offset nature of the light emitters relative to the lens), and by a longitudinal zone (because additional light emitters may be positioned along a length of a portion of the vehicle). For example, each lighting assembly may be used to achieve wave-like patterns or transitions in lighting, provide thematic lighting, lighting for branding, and the like.

FIG. 1 illustrates a perspective view of a lighting assembly 100, according to an embodiment of the present disclosure. The lighting assembly may include a housing 102 that includes a base 104 connected to upstanding lateral walls 106. An internal lighting chamber 108 is defined between the base 104 and the lateral walls 106.

Retention clips 110 may be used to secure the lighting assembly 100 to a structure, such as a ceiling, bin strongback, personal service unit, or wall within an internal cabin of a vehicle. Each retention clip 110 may include a rigid strap 112 connected to opposed lateral prongs 114. Internal surfaces of the lateral prongs 114 may include detents 116 that are configured to snapably secure to a ridge 118 that outwardly extends from each lateral wall 106. In this manner, the retention clips 110 may snapably secure to the housing 102. The strap 112 may be secured to the structure, such as through one or more fasteners, for example. More or less retention clips 110 than shown may be used. Alternatively, various other clips, fasteners, brackets, and/or the like may be used to secure the lighting assembly 100 to the structure.

A printed circuit board 120 is securely retained within the internal lighting chamber 108. The printed circuit board 120 may include one or more processors, drivers, traces, modules (such as stored in one more memories), and various other components that are used to control operation of the lighting assembly 100. Multiple light emitters are supported on the printed circuit board 120. One or more cables 122 route electrical wires to the printed circuit board 120 and are configured to provide power to the lighting assembly 100.

A lens 124 is secured within the internal lighting chamber 108 above the printed circuit board 120 (as shown in FIG. 1). The printed circuit board 120 is disposed between the lens 124 and the base 104 of the housing 102. The lens 124 may extend over a length of the internal lighting chamber 108. The lens 124 may be formed of a transparent or semi-transparent material, such as glass, clear plastic, or the like. As shown, the lighting assembly 100 may include a single lens 124.

Figure 2:
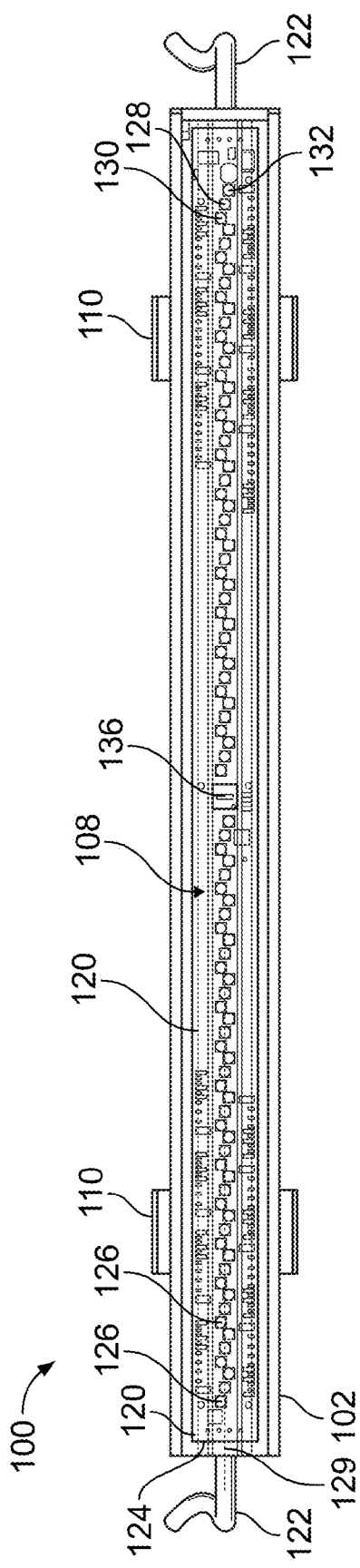
FIG. 2 illustrates a top plan view of a lighting assembly, according to an embodiment of the present disclosure.
Figure 3:
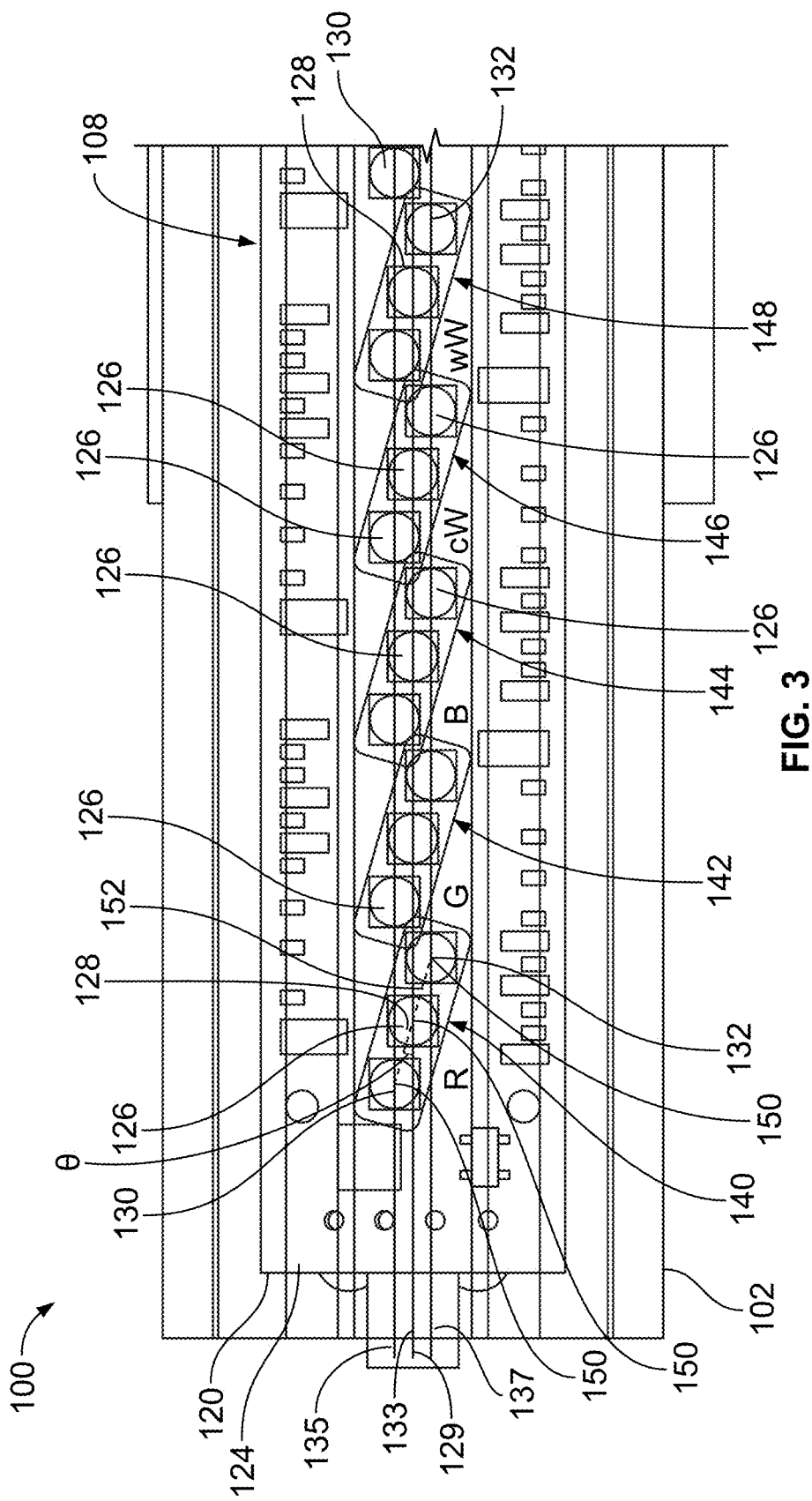
FIG. 3 illustrates a top close-up view of LED clusters of a lighting assembly, according to an embodiment of the present disclosure.

FIG. 2 illustrates a top plan view of the lighting assembly 100, according to an embodiment of the present disclosure. As noted, the printed circuit board 120 supports a plurality of light emitters, such as LEDs 126, groups of which may be aligned together in light-emitting channels. For example, while numerous LEDs 126 are shown in FIGS. 2 and 3, separate and distinct groups of the LEDs 126 may provide separate and distinct light-emitting channels. Alternatively, the light emitters may be various other light-emitting devices, such as incandescent or fluorescent light bulbs. A first linearly-aligned group of LEDs 126 extending linearly along the printed circuit board 120 form a first light-emitting channel 128, which is aligned with a central or primary longitudinal axis 129 of the lens 124. For example, central axes that extend from each LED 126 of the first light-emitting channel 128 and are normal to an upper surface of the printed circuit board 120 intersect the central longitudinal axis 129. A second linearly-aligned group of LEDs 126 extending linearly along the printed circuit board 120 form a second light-emitting channel 130 that is parallel to, but offset from, the central longitudinal axis 129. For example, central axes that extend from each LED 126 of the second light-emitting channel 130 and are normal to an upper surface of the printed circuit board 120 do not intersect the central longitudinal axis 129. As shown, the second light-emitting channel 130 is offset to a first side of the central longitudinal axis 129. A third group of linearly-aligned LEDs 126 extending linearly along the printed circuit board 120 form a third light-emitting channel 132 that is parallel to, but offset from, the central longitudinal axis 129, opposite from the second light-emitting channel 130. As shown, the third light-emitting channel 130 is offset to a second side (opposite from the first side) of the central longitudinal axis 129.

A central processing unit (CPU) 136 may be secured to the printed circuit board 120. The CPU 136 may be or include any computing device, memory, module, component, or the like that is configured to control operation of the lighting assembly 100.

FIG. 3 illustrates a top close-up view of LED clusters 140, 142, 144, 146, and 148 of the lighting assembly 100, according to an embodiment of the present disclosure. Each cluster 140, 142, 144, 146, and 148 may include one LED 126 from each light-emitting channel 128, 130, and 132 that is configured to emit light at a particular color. For example, the cluster 140 may be configured to emit Red light, the cluster 142 may be configured to emit Green light, the cluster 144 may be configured to emit Blue light, the cluster 146 may be configured to emit cool white light, and the cluster 148 may be configured to emit warm white light. As shown, the centers 150 of each LED 126 of a cluster may form a line 152 that is angled with respect to the central longitudinal axis 129. The LED 126 of each light-emitting channel 130 is above the central longitudinal axis 129, while the LED 126 of the light-emitting channel 128 is on the central longitudinal axis 129, and the LED 126 of the light-emitting channel 132 is below the central longitudinal axis 129. Each line 152 may be oriented at an angle θ with respect to the central longitudinal axis 129. For example, the angle θ may be between 15°-45°. Alternatively, the angle may be greater or lesser than 15°-45°. For example, the line 152 of each cluster 140, 142, 144, 146, and 148 may be perpendicular to the central longitudinal axis 129. The clusters 140, 142, 144, 146, and 148 may be angled as shown in order to fit all of the LEDs 126 within the internal lighting chamber 108 of the housing 102.

In operation, the LEDs 126 of each light-emitting channel 128, 130, and 132 may emit light to form a desired color of emitted light. For example, light from each LEDs 126 may vary in intensity and duration to emit light at a desired hue, brightness, and the like. For example, the LED 126 in the cluster 140 (Red) and the LED 126 in the cluster 144 (Blue) may simultaneously output light, while the other LEDs 126 are in an OFF state, thereby producing purple light.

Because the light-emitting channels 130 and 132 are offset with respect to the central longitudinal axis 129, the light assembly 100 may output and direct light to three separate and distinct locations (within a cabin of a vehicle, for example) through the use of the single lens 124. For example, the light-emitting channel 130 may emit a first beam of light that is directed to a first location, the light-emitting channel 128 may emit a second beam of light that is directed to a second location, and the light-emitting channel 132 may emit a third beam of light that is directed to a third location. The three locations may be separate and distinct from each other. Alternatively, portions of at least two of the locations may overlap with one another. The light-emitting channels 128, 130, and 132 may emit the separate and distinct light beams at the same or different times. For example, when one of the light-emitting channels 128, 130, or 132 is in an active or ON state, the other light-emitting channels 128, 130, or 132 may be in a deactivated or OFF state. As used herein, the term "activate" means to initially start or turn ON a light-emitting channel into an active state, while the term "deactivate" means to turn OFF a light-emitting channel. For example, a light-emitting channel is activated into an active state in which it emits light, while the light-emitting channel is deactivated by being turned OFF into an deactivated state in which it does not emit light.

The light-emitting channels 128, 130, and 132 provide three separate and distinct lighting devices within the common lighting assembly 100, which may also include only the single lens 124. Each light-emitting channel 128, 130, and 132 emits light that is directed to three separate and distinct locations, through the use of the single lens 124.

As shown, the center 150 of each LED 126 of the light-emitting channel 128 is disposed on and along a line 133 that is aligned with the central longitudinal axis 129 of the lens 124. That is, a plane that extends between the line 133 and the central longitudinal axis 129 may be normal or perpendicular to an upper planar surface of the printed circuit board 120. The center 150 of each LED 126 of the light-emitting channel 130 is disposed on and along a line 135 that is offset from the line 133. Similarly, the center 150 of each LED 126 of the light-emitting channel 132 is disposed on and along a line 137 that is offset from the line 133, opposite from the line 135. Accordingly, the light-emitting channels 130 and 132 are offset with respect to the central longitudinal axis 129. The light-emitting channels 130 and 132 are off-axis in relation to the central longitudinal axis 129. The offset light-emitting channels 130 and 132 may be symmetrical or asymmetrical with respect to the central longitudinal axis 129. For example the light-emitting channel 130 may be offset from the longitudinal axis 129 by a different distance than that of the light-emitting channel 132 from the longitudinal axis 129.

Figure 4:
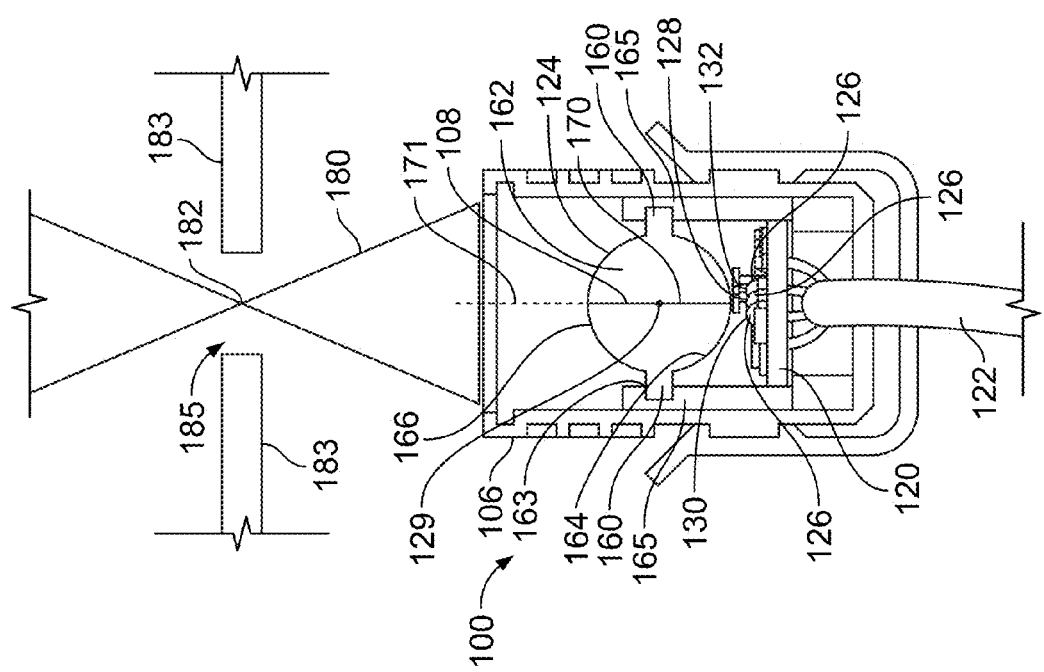
FIG. 4 illustrates an end view of a lighting assembly, according to an embodiment of the present disclosure.

FIG. 4 illustrates an end view of the lighting assembly 100, according to an embodiment of the present disclosure. The lens 124 may include lateral securing protuberances 160 that outwardly extend from a main body 162. The securing protuberances 160 may be fins, panels, or the like that are secured within reciprocal channels 163 of brackets 165 of the lateral walls 106.

The main body 162 of the lens 124 may have a modified cylindrical shape. A bottom portion 164 (that is, the portion proximate to the printed circuit board 120) of the main body 162 may have an eccentricity and/or curvature that may exceed that of a top portion 166. A radius 168 (extending from the central longitudinal axis 129 to an outer surface of the top portion 166) is a first distance. A radius 170 (extending from the central longitudinal axis 129 to an outer surface of the bottom portion 164) is a second distance. The second distance may exceed the first distance. The shape of the lens 124 allows for a beam of light output from the center, on-axis light-emitting channel 128 to pass out of the lens 124 parallel to a lateral or optical axis 171 of the lens 124 (the lateral axis 171 being perpendicular to the longitudinal axis 129). At the same time, the shape of the lens 124 allows for beams of light output from the offset, off-axis light-emitting channels 130 and 132 to pass out of the lens 124 in a canted direction that is not parallel with the lateral axis 171. As shown, the light emitted from the lighting assembly 100 when all of the light-emitting channels 128, 130, and 132 are active or in ON state forms a convergent beam 180 that may converge at a focal point 182 (or any point beyond the lens 124) and expands outwardly therefrom.

Because the light beam 180 converges at the focal point 182 and outwardly expands therefrom, the width of the light beam 180 is reduced as it is emitted out of the lighting assembly 100 toward the focal point. The reduced width of the light beam 180 toward the focal point as it is emitted out of the lighting assembly 100 allows the lighting assembly to be used in confined spaces in which barriers would otherwise block transmission of the light. For example, a barrier 183 having a narrow opening 185 would otherwise block at least a portion of a light beam that is as wide as the lens 124. However, the reduced width of the light beam 180 at the focal point 182 allows the light beam to be transmitted out through the narrow opening 185 in an unimpeded fashion (or slightly impeded), and widen and spread outwardly away from the focal point 182. In short, the shape of the lens 124 produces a convergent light beam that may pass unobstructed with greater efficiency and/or less loss through narrow or tight spaces.

Figure 5:
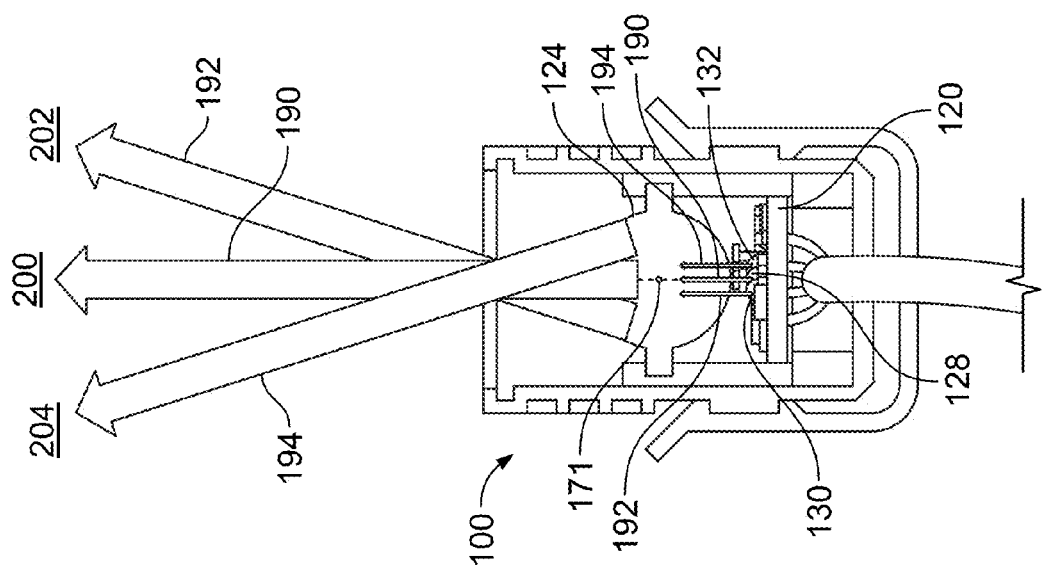
FIG. 5 illustrates an end view of a lighting assembly emitting three separate beams of light, according to an embodiment of the present disclosure.

FIG. 5 illustrates an end view of the lighting assembly 100 emitting three separate beams of light, according to an embodiment of the present disclosure. As shown, the central, on-axis light-emitting channel 128 emits a first beam 190 that passes through the lens 124 and is outwardly emitted therefrom in a straight, linear direction that is parallel to the lateral axis 171.

The off-axis light-emitting channel 130 emits a second beam 192 that is normal to an upper surface of the printed circuit board 120 (before encountering the lens 124). As the second beam 192 travels through the lens 124, however, the top portion 166 inwardly cants the second beam 192 toward the lateral axis 171 so that it crosses and outwardly diverges from the lateral axis 171 to an opposite side in relation to where the light-emitting channel 130 initially generated the second beam 192. Thus, while the light beam 192 is generated by the light-emitting channel 130 at the left side (in relation to FIG. 5) of the lighting assembly 100, the light beam 192 is directed to a location that is to the right of the light-channel 130.

Conversely, the off-axis light-emitting channel 132 emits a third beam 194 that is normal to an upper surface of the printed circuit board 120 (before encountering the lens 124). As the third beam 194 travels through the lens 124, however, the top portion 166 inwardly cants the third beam 194 toward the lateral axis 171 so that it crosses and outwardly diverges from the lateral axis 171 to an opposite side in relation to where the light-emitting channel 132 initially generated the third beam 194. Thus, while the light beam 194 is generated by the light-emitting channel 132 at the right side (in relation to FIG. 5) of the lighting assembly 100, the light beam 194 is directed to an area that is to the left of the light-channel 130.

In this manner, the single lens 124 may be used to direct light emitted from each light-emitting channel 128, 130, and 132 to three separate and distinct locations. For example, the light emitted from the light-emitting channel 128 is directed to a central location 200, while light emitted from the light-emitting channels 130 and 132 is directed to offset locations 202 and 204, respectively. Each of the light-emitting channels 128, 130, and 132 may be active at or proximate to the same time to produce the three light beams 190, 192, and 194 at the same time at the three separate and distinct locations 200, 202, and 204. Optionally, less than all of the light-emitting channels 128, 130, and 132 may be active at the same time.

Referring to FIGS. 1-5, light output from each of the light-emitting channels 128, 130, and 132 may be sequenced in order to provide various lighting effects, such as lighting motion effects. For example, light may be emitted from the light-emitting channel 130 at a first time, which may then be deactivated at a second time subsequent to the first time, when light may be emitted from the light-emitting channel 128. The light-emitting channel 128 may then be deactivated at a third time subsequent to the second time, when light may be emitted from the light channel 132, thereby producing a visual effect of light moving across a surface. In such an application, the times that the light-emitting channels 128, 130, and 132 are in the OFF state in long enough for a human to perceive that they are, in fact, deactivated. The duration of the deactivation of a light-emitting channel 128, 130, and 132, and the activation of the next light-emitting channel 128,130, and 132 in the sequence may be long enough to cause super-imposition, which may provide a blending transition that smooths a motion effect.

The CPU 136 may operate the light-emitting channels 128, 130, and 132 so that they are not all in the ON state at the same time. For example, the light-emitting channel 128 may be in an ON state during a first time period, in which the light-emitting channels 130 and 132 are in an OFF state. During a second time period that is later than the first time period, only the light-emitting channel 130 may be in an ON state, while during a third time period that is later than the second time period, only the light-emitting channel 132 may be in an ON state. The LEDs 126 of each light-emitting channel 128, 130, and 132 may cycle between ON and OFF states (for example, pulse width modulation) faster than a human can perceive, and, as such, may not appear to be flickering. While each light-emitting channel 128, 130, and 132 (and/or clusters of LEDs) may be activated at separate and distinct times (that is, staggered activation times), the light-emitting channels 128, 130, and 132 (and/or the cluster of LEDs) may remain in an ON state after activation.

Figure 6:
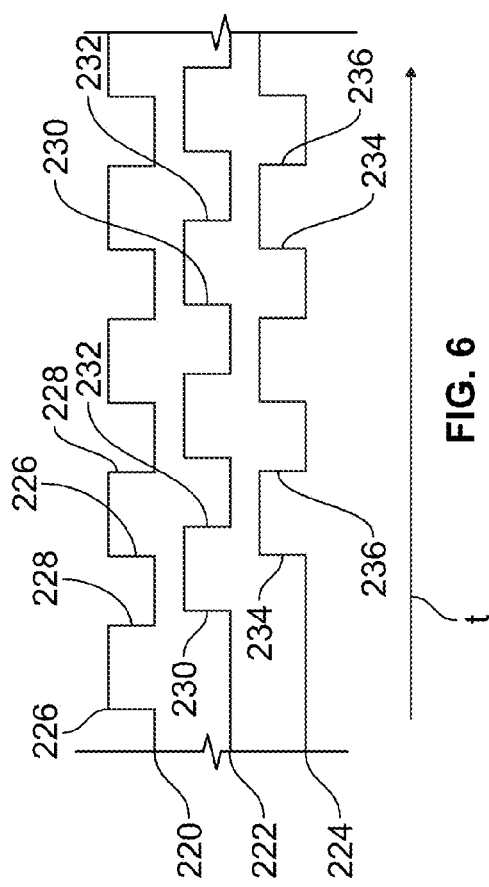
FIG. 6 illustrates waveforms of light-emitting channels over time, according to an embodiment of the present disclosure.

FIG. 6 illustrates waveforms 220, 222, and 224 of three separate and distinct light-emitting channels over time (t), according to an embodiment of the present disclosure. As shown, the waveform 220 includes a plurality of activation times 226 and deactivation times 228. Similarly, the waveform 222 includes a plurality of activation times 230 and deactivation times 232, while the waveform 224 includes a plurality of activation times 234 and deactivation times 236. Each light-emitting channel is in an ON state from an activation time until a deactivation time. Conversely, each light-emitting channel is an OFF state from a deactivation time until an activation time.

The ON state may be a duty cycle of 50%, for example, while the OFF state may be a duty cycle of 0%. Alternatively, the ON state may be greater or less than 50%, but in any case greater than 0%.

As shown, the activation times 226, 230, and 234 are staggered. The activation times 226, 230, and 234 do not occur at the same time. Instead, each activation time 226, 230, and 234 occurs at a separate and distinct time. While the activation times are staggered, two or more of the light-emitting channels may be in an ON state for at least a portion of time after initially activated.

Referring to FIGS. 1-6, activation of each light-emitting channel 128, 130, and 132 may be staggered in order to minimize or otherwise reduce electromagnetic interference (EMI) generated by the lighting assembly 100. The CPU 136 may cause drivers operatively connected to each of the light-emitting channels 128, 130, and 132 to activate at separate and distinct times, so that not all of the light-emitting channels 128, 130, and 132 are active at the same time. Further, the CPU 136 may operate sub-channels or the clusters of LEDs 126 in a similar fashion. By minimizing or reducing the starting or activation times of each light-emitting channel 128, 130, and 132, and/or the clusters, the EMI signature of the lighting assembly 100 is reduced.

Figure 7:
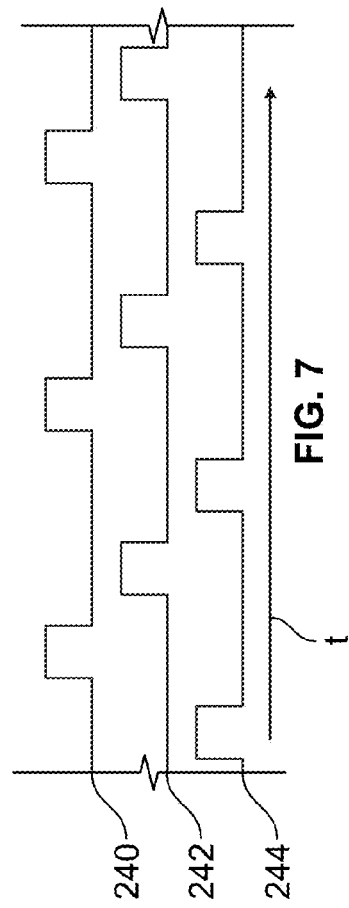
FIG. 7 illustrates waveforms of light-emitting channels over time, according to an embodiment of the present disclosure.

FIG. 7 illustrates waveforms 240, 242, and 244 of light-emitting channels over time, according to an embodiment of the present disclosure. As shown, each waveform 240, 242, and 244 cycles between ON and OFF states. The light-emitting channels may be ON at separate and distinct times. That is, when one of the light-emitting channels is in an ON state, the other light-emitting channels are in an OFF state.

Figure 8:
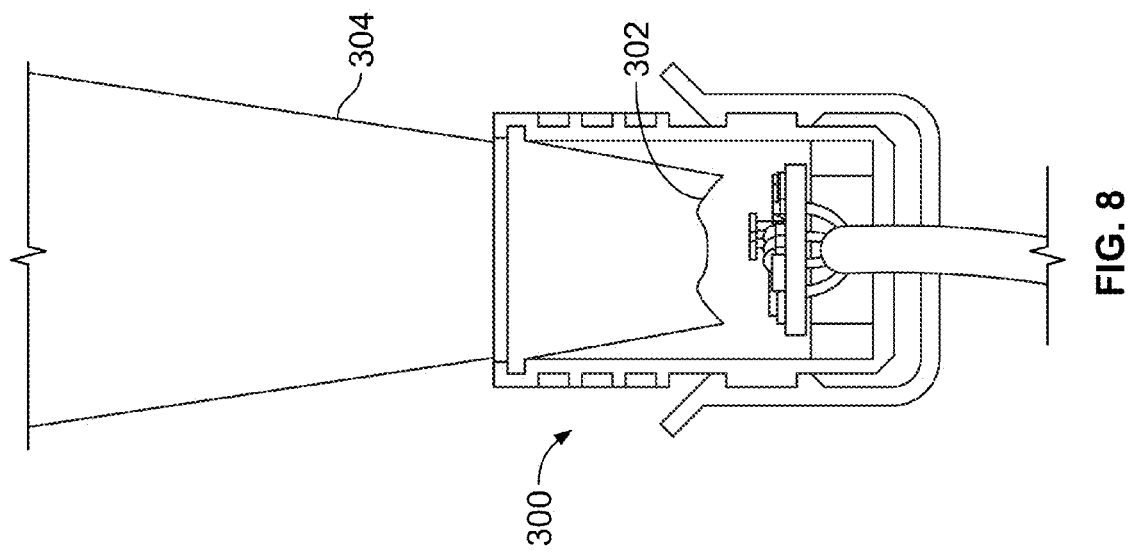
FIG. 8 illustrates an end view of a lighting assembly, according to an embodiment of the present disclosure.

FIG. 8 illustrates an end view of a lighting assembly 300, according to an embodiment of the present disclosure. The lighting assembly 300 is similar to the lighting assembly 100, except that the lighting assembly 300 includes a lens 302 that is configured to output a divergent light beam 304.

Figure 9:
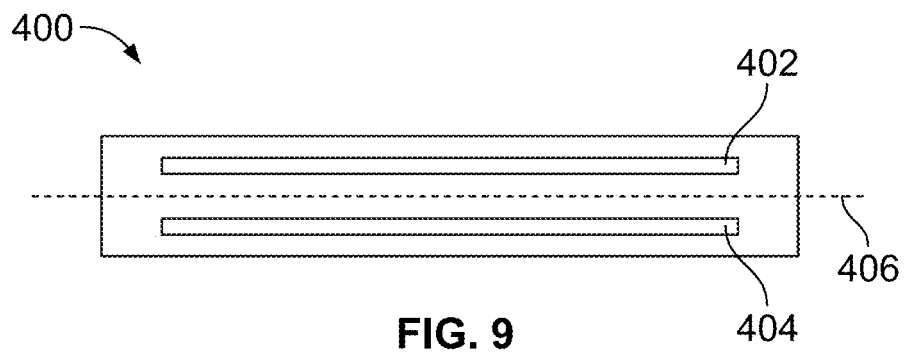
FIG. 9 illustrates a simplified top view of a lighting assembly, according to an embodiment of the present disclosure.

FIG. 9 illustrates a simplified top view of a lighting assembly 400, according to an embodiment of the present disclosure. The lighting assembly 400 includes first and second light-emitting channels 402 and 404, respectively, each of which may include a plurality of LEDs, as explained above. The light-emitting channels 402 and 404 are offset with respect to a central longitudinal axis 406 of a lens. That is, the light-emitting channels 402 and 404 are off-axis. As shown, the lighting assembly 400 may not include a light-emitting channel that is aligned with the central longitudinal axis 406.

Figure 10:
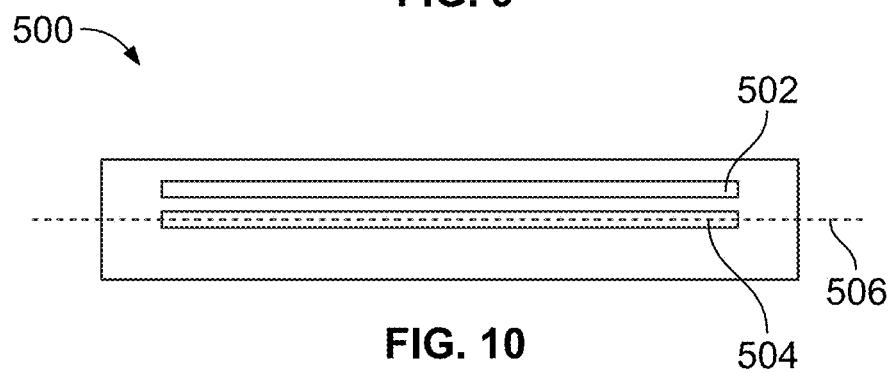
FIG. 10 illustrates a simplified top view of a lighting assembly, according to an embodiment of the present disclosure.

FIG. 10 illustrates a simplified top view of a lighting assembly 500, according to an embodiment of the present disclosure. The lighting assembly 500 includes first and second light-emitting channels 502 and 504, respectively, each of which may include a plurality of LEDs, as explained above. The light-emitting channel 502 is offset with respect to a central longitudinal axis 506 of a lens, while the light-emitting channel 504 is aligned with the central longitudinal axis 506 (that is, the light-emitting channel 504 is on-axis).

Figure 11:
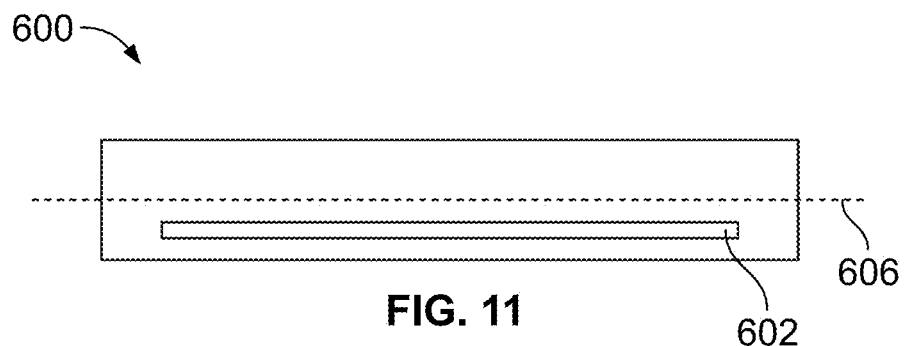
FIG. 11 illustrates a simplified top view of a lighting assembly, according to an embodiment of the present disclosure.

FIG. 11 illustrates a simplified top view of a lighting assembly 600, according to an embodiment of the present disclosure. The lighting assembly 600 includes a single light-emitting channel 602, which may include a plurality of LEDs, as explained above. The light-emitting channel 602 is offset with respect to a central longitudinal axis 606 of a lens.

Figure 12:
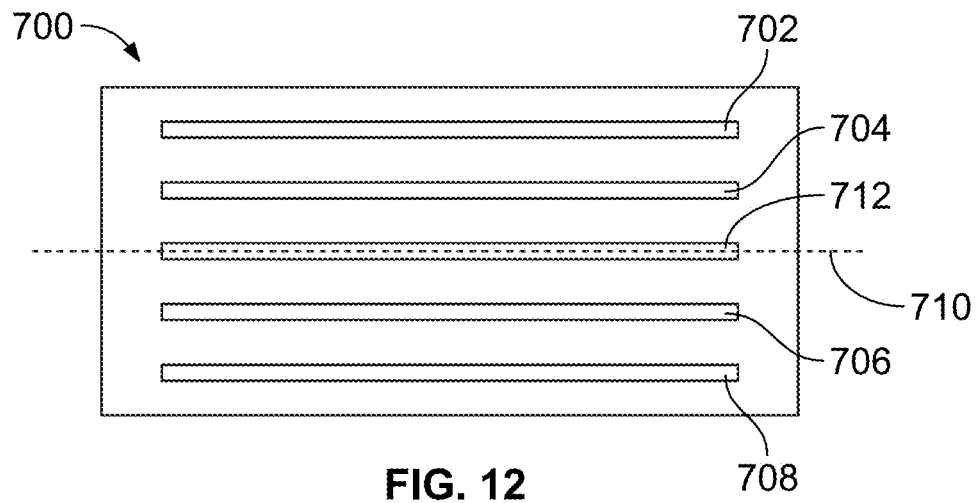
FIG. 12 illustrates a simplified top view of a lighting assembly, according to an embodiment of the present disclosure.

FIG. 12 illustrates a simplified top view of a lighting assembly 700, according to an embodiment of the present disclosure. The lighting assembly 700 includes first, second, third, and fourth light-emitting channels 702, 704, 706, 708, respectively, each of which may include a plurality of LEDs, and each of which may be offset with respect to a central longitudinal axis 710 of a lens. The lighting assembly 700 may also include a fifth light-emitting channel 712 that is on-axis. Alternatively, the lighting assembly 700 may not include the fifth light-emitting channel 712. Also, alternatively, the lighting assembly 700 may include more or less light-emitting channels than shown.

Figure 13:
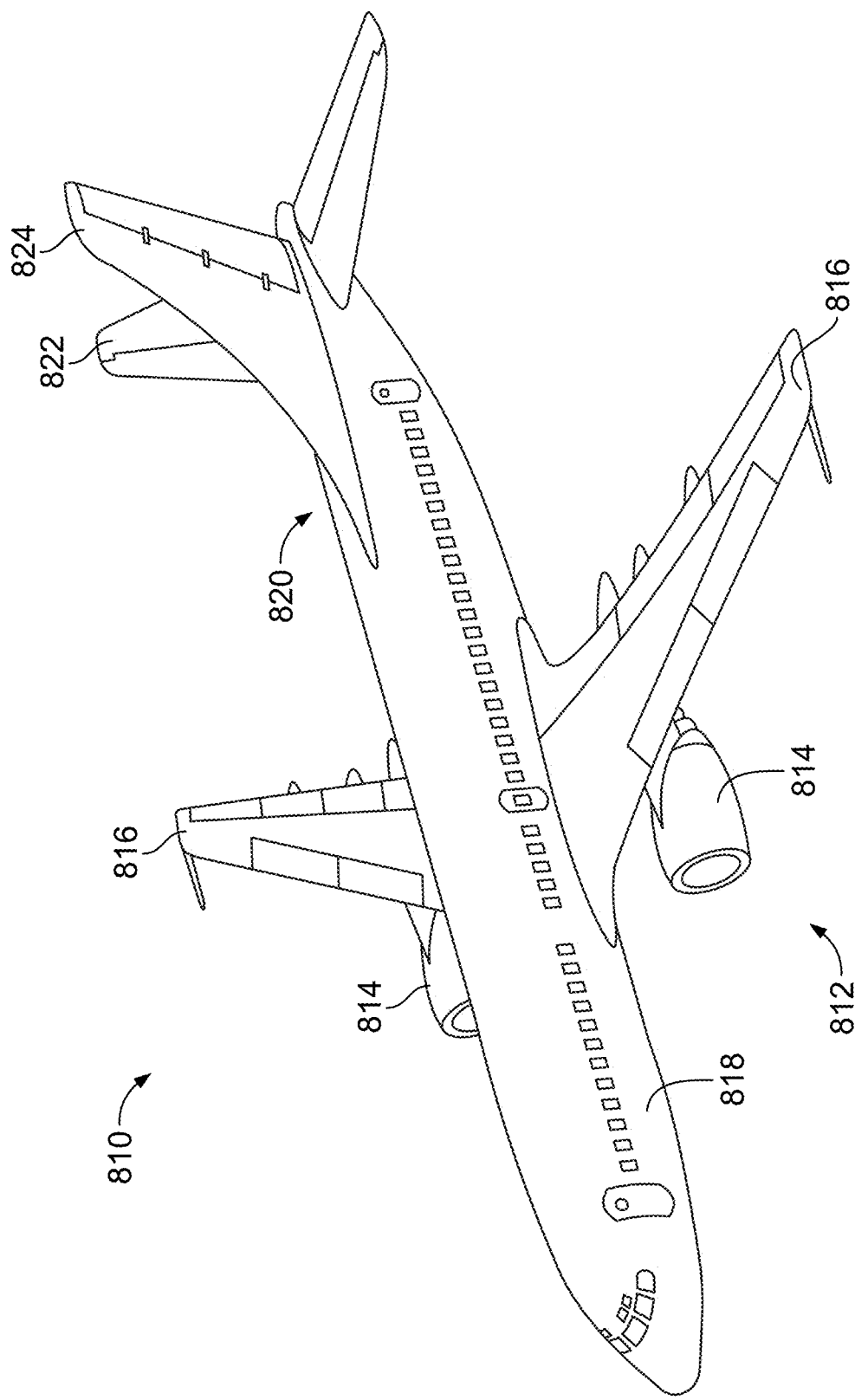
FIG. 13 illustrates a perspective top view of an aircraft, according to an embodiment of the present disclosure.

FIG. 13 illustrates a perspective top view of an aircraft 810 (or aircraft assembly), according to an embodiment of the present disclosure. The aircraft 810 is an example of a vehicle having an interior space or cabin in which any of the lighting assemblies described above with respect to FIGS. 1-12 may be used. Alternatively, instead of an aircraft, the lighting assemblies may be used with various other vehicles, such as automobiles, locomotives and train cars, seacraft, spacecraft, and the like.

The aircraft 810 may include a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 10 defines an internal cabin, which may include a cockpit, one or more work sections (for example, galleys, personnel carry-on baggage areas, and the like), and one or more passenger sections (for example, first class, business class, and coach sections). Each of the sections may be separated by a cabin transition area, which may include a curtain assembly having a moveable curtain that may be selectively opened and closed within an aisle.

Figure 14:
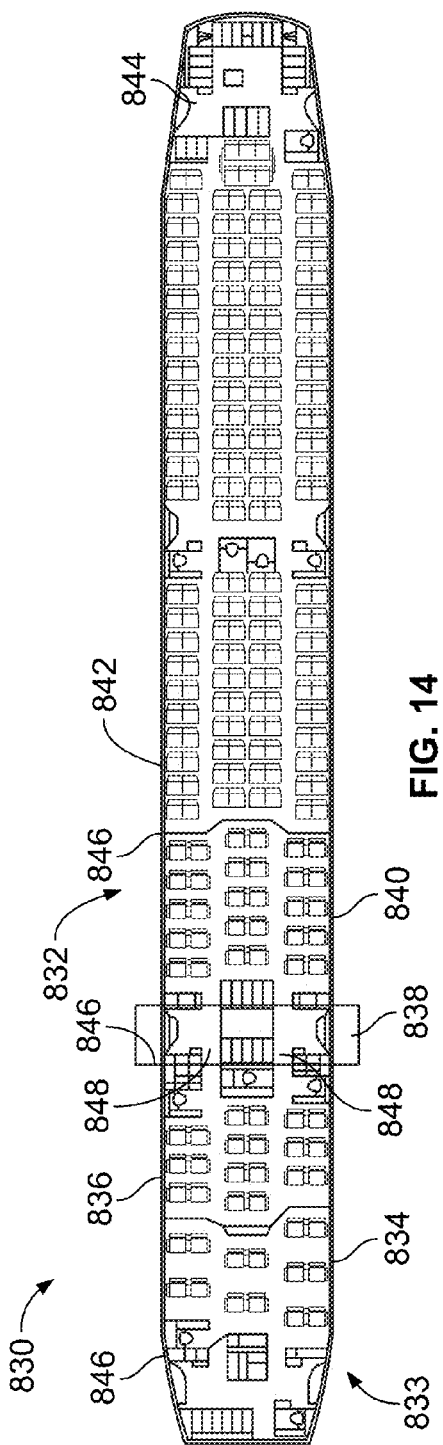
FIG. 14 illustrates a top plan view of an internal cabin of an aircraft, according to an embodiment of the present disclosure.

FIG. 14 illustrates a top plan view of an internal cabin 830 of an aircraft, according to an embodiment of the present disclosure. The internal cabin 830 may be within a fuselage 832 of the aircraft. The internal cabin 830 may include multiple sections, including a front light ring section 833, a first class section 834, a business class section 836, a front galley section 838, an expanded economy or coach section 840, a standard economy of coach section 842, and a rear galley section 844. It is to be understood that the internal cabin 830 may include more or less sections than shown. For example, the internal cabin 830 may not include a first class section, and may include more or less galley sections than shown. Each of the sections may be separated by a cabin transition area 846, which may include curtain assemblies between structural features (such as monuments, overhead bins, or the like) within aisles 848.

Figure 15:
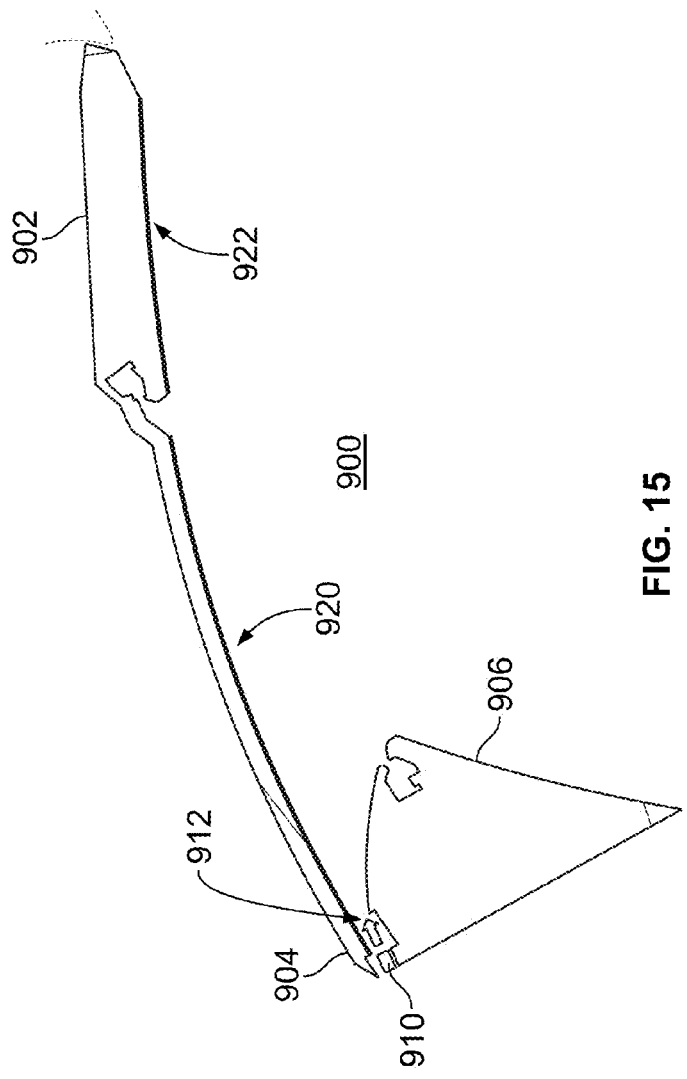
FIG. 15 illustrates an axial cross-sectional view of a portion of an internal cabin of an aircraft, according to an embodiment of the present disclosure.

FIG. 15 illustrates an axial cross-sectional view of a portion of an internal cabin 900 of an aircraft, according to an embodiment of the present disclosure. The internal cabin 900 may be defined, in part, by a ceiling 902 and a side wall 904. A luggage bin 906 may be pivotally or slidably secured to the side wall 904.

A lighting assembly 910, such as any of those described with respect to FIGS. 1-12, is secured within a channel 912 above the luggage bin 906 and underneath the ceiling 902 and/or inboard of the side wall 904. The channel 912 provides a small area into which the lighting assembly 910 may be secured. Because the lighting assembly 910 may include multiple light-emitting channels, at least one of which may be off-axis, the lighting assembly 910 is able to emit light onto different locations 920 and 922. Additional lighting assemblies may be used throughout the cabin, and at different locations.

Notably, with prior known lighting systems, when an LED emits light on a stowbin across an aisle, the closest uppermost portion of the stowbin tends to be well-lit, while the lower portion of the stowbin (because it is further away and angled away from the LED) tends to be darker. Accordingly, a shadow typically existed toward the bottom of the stowbin.

In stark contrast, embodiments of the present disclosure provide lighting assemblies that eliminate, minimize, or otherwise reduce such shadows, as the lighting assemblies are configured to control brightness in multiple directions. Moreover, the lighting assemblies are able to project bright, even light on lower portions of stowbins, which, as noted, were susceptible to shadows when illuminated by prior known lighting systems. In order for prior known systems to reduce such shadows, multiple lighting housing would need to be used, which would add weight and cost, and may not be able to fit within a particular confined space.

Figure 16:
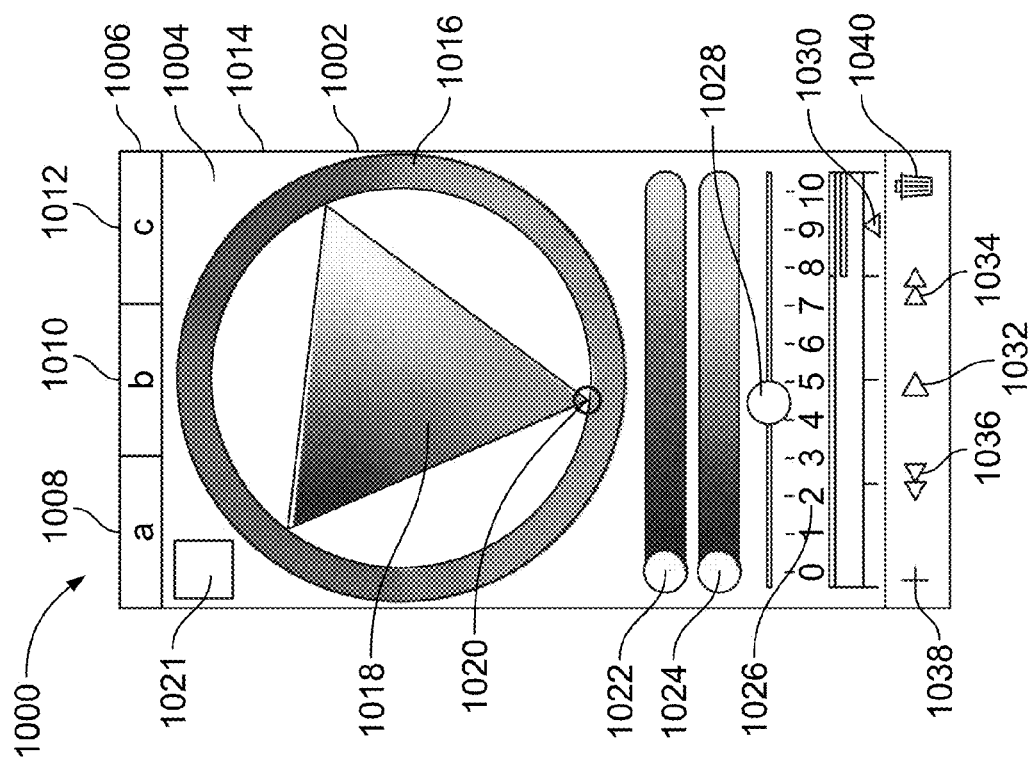
FIG. 16 illustrates a front view of a user interface of one or more lighting assemblies, according to an embodiment of the present disclosure.

FIG. 16 illustrates a front view of a user interface 1000 of one or more lighting assemblies, according to an embodiment of the present disclosure. The user interface 1000 may be remotely located from the lighting assemblies. Alternatively, the user interface 1000 may be securely mounted to a housing of a lighting assembly. The user interface 1000 and the one or more lighting assemblies form a system for controlling the lighting within a vehicle, such as an aircraft.

The user interface 1000 includes a housing 1002, such as a handheld device. For example, the user interface 1000 may be a smart device, such as a cellular phone, that includes an application for lighting control. Optionally, the housing 1002 may be a dedicated lighting control user interface that is coupled to a portion of an internal cabin of a vehicle, such as through wiring or a wireless connection. The housing 1002 retains at least one processor that is configured to control operation and a communication device, such as a transceiver, that is in communication with the CPU of the lighting assembly.

The housing 1002 includes a display 1004 that includes various controls. The display 1004 may provide a touch screen interface that allows an individual to touch areas on the display 1004 to control operation of a lighting assembly. A channel selection area 1006 is shown on the display. The channel selection area 1006 provides a plurality of channel buttons 1008, 1010, and 1012 that a user may engage (such as through a tap and hold) to select a particular light-emitting channel of light emitting display. For example, each channel button 1008, 1010, and 1012 is associated with a separate and distinct light-emitting channel.

After a particular channel is selected through the channel selection area 1006, an individual may then select a particular color of emitted light through a color selection area 1014. The color selection area 1014 may include a color ring 1016, which may display all available colors (e.g., the color spectrum R-O-Y-G-B-I-V). A color selector 1018 may be located within the color ring 1016. The color selector 1018 may include a moveable selection member 1020 (such as a highlighted area, marking, or the like) that an individual may engage with a finger. The individual may then rotate the color selector 1018 through the selection member 1020 to a desired color of the color ring 1016. Once the color is selected, the individual may then adjust the brightness, saturation, and or the like of by moving a finger over an internal area of the color selector 1018. A selected color area 1021 shows the color as currently selected.

The display 1004 may also include a cool white setting slide 1022 and a warm white setting slide 1024. The slides 1022 and 1024 allow the individual to adjust the intensity, brightness, and/or the like of cool and warm white by sliding a finger thereover.

The display 1004 may also include a mode swipe area 1026 that allows an individual to switch between various lighting modes. A transition duration slide button 1028 may be used to adjust the duration of each lighting mode. A current lighting indication 1030, such as a triangular marking, may indicate the current lighting mode being adjusted and/or shown.

The display 1004 may also include a play button 1032, which allows a lighting scene or mode to be activated, and forward and backward buttons 1034 and 1036, which allow an individual to quickly move between set lighting scenes and modes. Additionally, an add scene button 1038 may be used to add a custom scene or mode, while a delete button 1040 may be used to delete a set lighting scene or mode.

Figure 17:
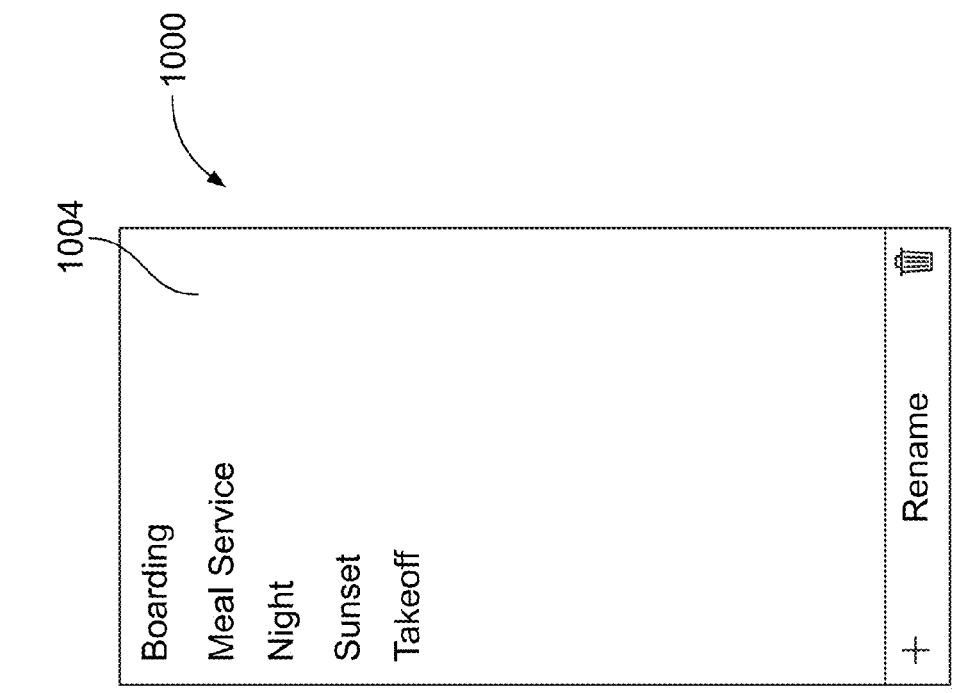
FIG. 17 illustrates a front view of a user interface of one or more lighting assemblies in a scene setting mode, according to an embodiment of the present disclosure.

FIG. 17 illustrates a front view of the user interface 1000 of one or more lighting assemblies in a scene setting mode, according to an embodiment of the present disclosure. The mode swipe area, for example, may be engaged to review available scenes stored within a memory of the user interface 1000 and/or the one or more lighting assemblies. For example, various lighting scenes may be stored, such as separate and distinct lighting scenes for boarding, meal service, night, sunset and takeoff.

Referring to FIGS. 16 and 17, the user interface 1000 may be used to program various lighting scenes. Once programmed, the user interface 1000 may be used to switch the one or more lighting assemblies between the various lighting scenes.

Referring to FIGS. 1-17, embodiments of the present disclosure provides systems and methods of illuminating internal locations of a vehicle, such as a cabin of an aircraft, that include versatile and adaptable lighting assemblies.

Embodiments of the present disclosure provide a lighting assembly that may include a housing and at least one light-emitting channel that is offset from a central longitudinal axis of a lens (the light-emitting channel is off-axis). The housing may retain multiple light-emitting channels that are each configured to emit light, which is then directed by the lens to separate and distinct locations. For example, light emitted from a first light-emitting channel is directed to a first location, while light emitted from a second light-emitting channel is directed to a second location that includes at least a portion that is separate and distinct from the first location. Embodiments of the present disclosure provide a light assembly that may replace multiple luminaires (for example, previously, in order to direct light to separate and distinct areas, multiple luminaires were used) within a vehicle, thereby reducing the overall weight of the vehicle.

As used herein, the term "central processing unit," "CPU," "computer," "control unit," "module," or the like may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "central processing unit," "CPU," "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more of a field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A lighting assembly configured to be positioned within an internal cabin of a vehicle, the lighting assembly comprising:

a housing defining an internal lighting chamber;
  a lens secured within the internal lighting chamber, wherein the lens includes a central longitudinal axis; and
  at least one light-emitting channel secured within the internal lighting chamber, wherein the at least one light-emitting channel is offset in relation to the central longitudinal axis,
  wherein a user interface is configured to program and control the lighting assembly, wherein the user interface comprises a touch screen display that includes a channel selection area and a color selection area.

2. The lighting assembly of claim 1, wherein the at least one light-emitting channel comprises:
- a first light-emitting channel offset from the central longitudinal axis at a first area; and
- a second light-emitting channel offset from the central longitudinal axis at a second area that differs from the first area.

3. The light assembly of claim 2, wherein the first light-emitting channel is configured to output a first light beam that passes through the lens and is directed to a first location, and wherein the second light-emitting channel is configured to output a second light beam that passes through the lens and is directed to a second location, wherein at least a portion of the second location is separate and distinct from the first location.

4. The lighting assembly of claim 2, wherein each of the first and second light-emitting channels comprises a plurality of light emitting diodes (LEDs), and wherein LEDs of the first and second light-emitting channels that are configured to emit the same color light are grouped in light clusters.

5. The lighting assembly of claim 2, wherein the first and second light-emitting channels are configured to be activated in a staggered fashion, wherein the first light-emitting channel is activated at first times, and wherein the second light-emitting channel is activated at second times that differ from the first times.

6. The lighting assembly of claim 2, wherein the first and second light-emitting channels are configured to be in an ON state at different times, wherein the first light-emitting channel is in the ON state at first times, and wherein the second light-emitting channel is in the ON state at second times that differ from the first times.

7. The light assembly of claim 1, further comprising an on-axis light-emitting channel that is aligned with the central longitudinal axis.

8. The lighting assembly of claim 1, wherein the at least one light-emitting channel comprises a plurality of light-emitting diodes (LEDs).

9. The lighting assembly of claim 1, further comprising a printed circuit board including a central processing unit, wherein the at least one light emitting channel is mounted on the printed circuit board.

10. The lighting assembly of claim 1, wherein the lens includes a modified cylindrical shape with a first portion having a different curvature than a second portion.

11. The lighting assembly of claim 1, wherein the lens is a convergent lens.

12. A system for controlling lighting within an interior cabin of a vehicle, the system comprising:
- a lighting assembly configured to be positioned within an internal cabin of a vehicle, the lighting assembly comprising: (a) a housing defining an internal lighting chamber; (b) a lens secured within the internal lighting chamber, wherein the lens includes a central longitudinal axis; and (c) at least one light-emitting channel secured within the internal lighting chamber, wherein the at least one light-emitting channel is offset in relation to the central longitudinal axis; and
- a user interface that is configured to program and control the lighting assembly, wherein the user interface comprises a touch screen display that includes a channel selection area and a color selection area.

13. The system assembly of claim 12, wherein the color selection area comprises a color ring and a color selector.

14. A vehicle comprising:
- an interior cabin configured to accommodate one or more individuals;
- at least one lighting assembly positioned within the interior cabin, wherein the at least one lighting assembly comprises (a) a housing defining an internal lighting chamber; (b) a lens secured within the internal lighting chamber, wherein the lens includes a central longitudinal axis; and (c) at least one light-emitting channel secured within the internal lighting chamber, wherein the at least one light-emitting channel is offset in relation to the central longitudinal axis; and
- a user interface that is configured to program and control the lighting assembly, wherein the user interface comprises a touch screen display that includes a channel selection area and a color selection area.

15. The vehicle of claim 14, wherein the at least one light-emitting channel comprises:
- a first light-emitting channel offset from the central longitudinal axis at a first area, wherein the first light-emitting channel is configured to output a first light beam that passes through the lens and is directed to a first location; and
- a second light-emitting channel offset from the central longitudinal axis at a second area that differs from the first area, wherein the second light-emitting channel is configured to output a second light beam that passes through the lens and is directed to a second location, and wherein at least a portion of the second location is separate and distinct from the first location.

16. The vehicle of claim 15, wherein the first and second light-emitting channels are configured to be activated in a staggered fashion, wherein the first light-emitting channel is activated at first times, and wherein the second light-emitting channel is activated at second times that differ from the first times.

17. The vehicle of claim 15, wherein the lighting assembly further comprises a third light-emitting channel that is aligned with the central longitudinal axis.

18. The vehicle of claim 15, wherein the lens is a convergent lens comprising a modified cylindrical shape with a first portion having a different curvature than a second portion.

19. The lighting assembly of claim 1, wherein the color selection area comprises a color ring and a color selector.

20. The vehicle of claim 14, wherein the color selection area comprises a color ring and a color selector.

* * * * *